Dec. 7, 1954 P. G. KAPPUS 2,696,079
DUAL JET AIRCRAFT POWER PLANT
Filed April 17, 1950
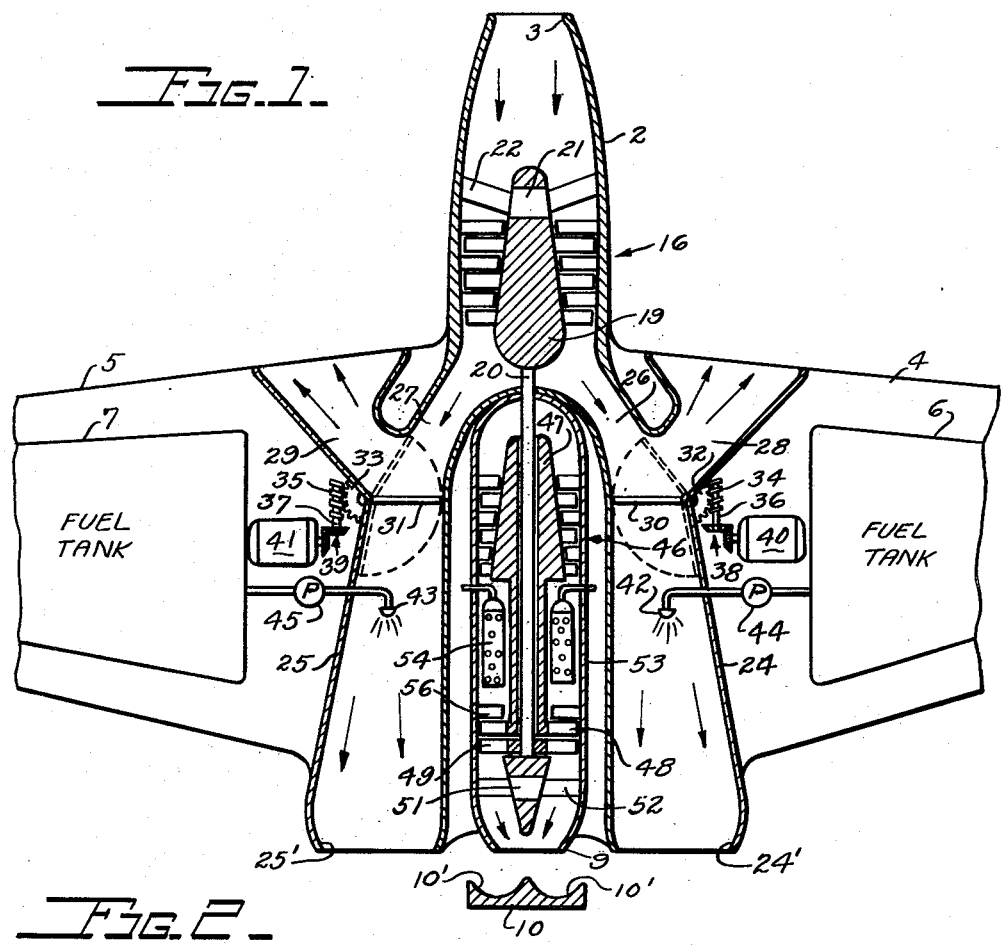
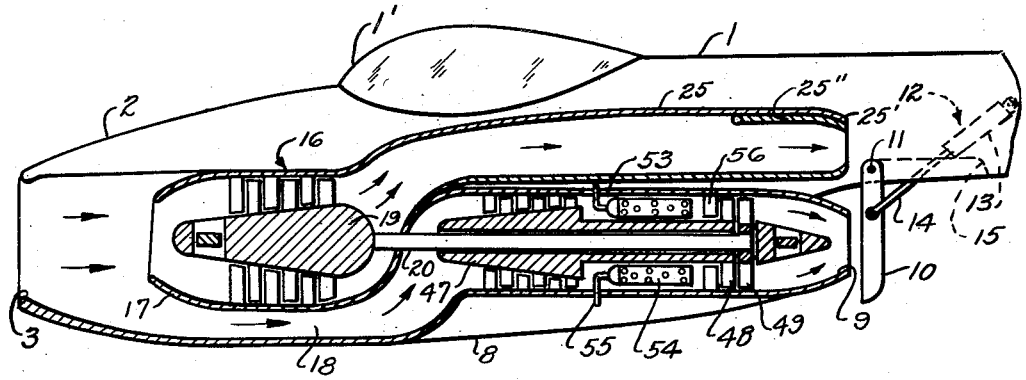
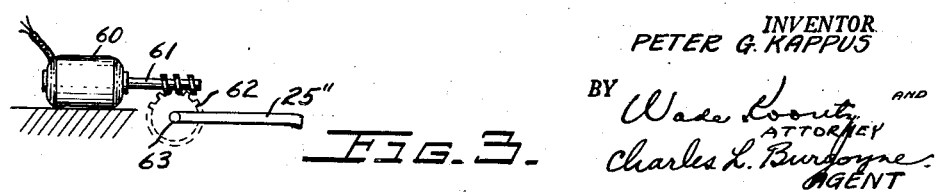
INVENTOR
PETER G. KAPPUS United States Patent Office 2,696,079
Patented Dec. 7, 1954

2,696,079

DUAL JET AIRCRAFT POWER PLANT

Peter G. Kappus, Dayton, Ohio

Application April 17, 1950, Serial No. 156,431

3 Claims. (Cl. 60—35.54)

(Granted under Title 35, U. S. Code (1952), sec. 266)

The invention described herein may be manufactured and used by or for the United States Government for governmental purposes without payment to me of any royalty thereon.

The present invention relates to an aircraft power plant using a dual jet or dual cycle system.

The primary object of the invention is to provide a jet power plant for aircraft including a dual air compressor driven by a gas turbine and to use the outputs of the two air compressors for feeding air to two separate engine cycles one of which includes the gas turbine and air exhaust nozzle opening rearwardly of the aircraft power plant.

A further object of the invention is to provide a jet power plant for aircraft including a dual air compressor centrally located in the aircraft fuselage and driven by a gas turbine coaxial with respect to the dual air compressor, to use the output of one air compressor located nearest the forward end of the fuselage for feeding air to twin coburning chambers and to use the output of the second air compressor for feeding combustion chambers supplying hot gases to the gas turbine, and wherein the coburning chambers and the gas turbine have their outlet ends connected to exhaust nozzles opening to the atmosphere rearwardly of the aircraft power plant.

Another object of the invention is to provide a jet power plant for aircraft including a turbine driven air compressor to supply air alternatively to coburning chambers opening rearwardly of the aircraft or to exhaust conduits opening forwardly of the aircraft to thus provide according to choice a propulsive effect or a decelerating effect on the aircraft.

Another object of the invention is to generally improve the operating characteristics and usefulness of dual cycle jet power plants as applied to aircraft.

The above and other objects of the invention will become apparent upon reading the following detailed description in conjunction with the accompanying drawing, in which:

Fig. 1 is a horizontal sectional view of the present dual jet power plant as installed in an airplane.

Fig. 2 is a vertical sectional view of the present dual jet power plant as installed in an airplane.

Fig. 3 is a schematic view of one possible actuating mechanism for a hinged flap forming part of the power plant control system.

In a typical turbojet aircraft engine including an air compressor, combustion chamber, gas turbine and exhaust nozzle all in series connected relation with the turbine driving the compressor there are numerous ways to increase the thermodynamic efficiency, such as increasing the compressor and turbine efficiencies by careful design, increasing the pressure ratio of the cycle, increasing the combustion temperature and decreasing the resistance to gas flow through the exhaust nozzle. All these expedients lead to higher jet velocities which in turn lessens the propulsion efficiency under average conditions. Therefore a part of the efficiency gain in the cycle is lost as far as propulsion efficiency is concerned. The dual cycle engine system offers one possible chance of overcoming the loss in propulsion efficiency and making full use of any possible increases in engine or cycle efficiency. The dual cycle system disclosed in the present description offers alternatives depending on desired speed and thrust of the aircraft and has been termed a dual jet aircraft power plant because the latter term seems better suited to the arrangement disclosed wherein the mass flow handled in the two cycles is of the same order of magnitude. Also the term appears more apt because there is fuel combustion in each of the two cycles.

For a description of the dual jet aircraft power plant reference is made to Figs. 1 and 2 showing the aircraft and the built-in power plant in schematic form. The aircraft proper includes a central fuselage 1 including a forwardly directed nose section 2 open at the forward end to provide an air intake or inlet 3. Projecting transversely from opposite sides of the fuselage are the right and left wings 4 and 5, which may have any desired cross sectional shape and preferably enclosing fuel tanks 6 and 7. Directly to the rear of the aircraft nose section 2 the fuselage 1 includes a downwardly extending engine nacelle section 8 open at the rearward end to provide an exhaust nozzle 9 discharging into the atmosphere directly below the rearwardly extending fuselage 1. Pivotally mounted on the fuselage rearwardly of the exhaust nozzle is an exhaust deflector or spoiler 10 which may have a cross sectional shape as indicated in Fig. 1. The flow spoiler 10 is pivotally mounted at 11 and connected between the spoiler and fuselage is an actuator 12 which includes a hydraulic cylinder 13 having a piston rod 14 extending to the spoiler and pivoted thereon. A recess 15 in the fuselage serves to completely house the spoiler 10 when it is in the retracted position. When the spoiler is in the projected position as shown it acts to destroy the normal free rearward flow of the exhaust gases issuing from the nozzle 9 and causes the flowing gases to divide and flow laterally as well as forwardly from the similar depressions 10' formed in the spoiler 10. Thus the normal propulsive effect of the flowing exhaust gases is destroyed and instead there is a braking action on the aircraft as the gases reverse their direction of flow. This spoiling action is only for use in decelerating the aircraft, as in landing on a limited area such as a carrier flight deck or emergency landing field. It is also noted that the fuselage 1 includes a pilot's cockpit normally covered by a transparent canopy 1'.

Mounted in the nose section 2 of the airplane fuselage is an air compressor 16, preferably of the axial flow type and contained in a housing 17 spaced from the lower wall of the nose section 2 sufficiently to provide a passage 18 to carry a portion of the ram air around the compressor 16 to supply air for the turbojet cycle. The passage 18 may be termed a ram air bypass. The air compressor 16 enclosed within the housing 17 includes a rotor 19 rigidly connected to a longitudinally extending drive shaft 20. At its forward end the drive shaft is rotatably supported by a bearing assembly 21 rigidly connected to the compressor housing by struts 22. The radially extending blades on the rotor 19 rotate close to fixed blades in order to gradually build up the ram air pressure to a maximum as it issues from the outlet end of the compressor. This first air compressor will usually include more stages than in the illustrated structure but this is merely a design consideration. The air from the compressor 16 supplies one of the engine cycles or jets in a manner to be described.

Located at the roots of wings 4 and 5 are coburning chambers 24 and 25 extending generally in a fore-and-aft direction and connected to the outlet of compressor 16 by similar passages 26 and 27 which not only branch to the right and left (see Fig. 1) but also extend upwardly (see Fig. 2) to reach the chambers 24 and 25. The chambers are open at the rear end to provide exhaust nozzles 24' and 25', which have a variable cross sectional area as determined by the setting of a hinged flap or damper as indicated at 25'' in Fig. 2. Numerous other types of variable area nozzles may be substituted according to choice or convenience. The chambers 24 and 25 may also have rearwardly diverging walls, as shown in Fig. 1, to permit better expansion of the products of combustion as they flow rearwardly from the chambers. At their forward ends the chambers 24 and 25 also connect with air passages 28 and 29 extending from the leading edges of the wings 4 and 5 adjacent to the root ends. The compressed air passages 26 and 27 connect with the passages 28 and 29 respectively to obtain a negative thrust by reversing the flow of compressed air and directing it in a direction forwardly of the airplane. To control the action of the air in the passages above described, there are a pair of similar air control gates 30 and 31. The gates are each pivotally mounted at the forward ends of the chambers 24 and 25 with the pivot points at the outboard sides of the chambers. Rigid with the gates are gear sectors 32 and 33 engaged by worms 34 and 35 mounted on shafts 36 and 37 and driven through meshing pairs of bevel gears 38 and 39 and motors 40 and 41. In the position of the gates 30 and 31 as shown in Fig. 1 in solid lines the chambers 24 and 25 are closed at their forward ends to prevent entry of any air thereinto from the passages 26 to 29. Now the compressed air entering at passages 26 and 27 can only reverse its direction and pass out through the ram air passages 28 and 29 to give a retarding or decelerating action on the aircraft. When the gates are swung to the forward position shown in dotted lines, the compressed air flowing in the passages 26 and 27 is free to flow into the coburning chambers 24 and 25 but no ram air can flow in the passages 28 and 29. When the gates are in the rearward position shown in dotted lines, the ram air entering the passages 28 and 29 flows freely into the chambers 24 and 25 to support combustion therein even though the air compressor 16 is out of commission through some mechanical failure of the rotating engine components. Under these conditions the chambers 24 and 25 operate as ramjets to provide emergency propulsive power for the airplane. Each coburning chamber is equipped with one or more fuel injectors or nozzles as indicated at 42 and 43, and liquid fuel is fed thereto by means of fuel lines connected to fuel tanks 6 and 7 with fuel pumps 44 and 45 in the fuel lines to supply fuel to the injectors under high pressure to obtain optimum atomization of the fuel. When air and fuel are supplied to the coburning chambers and combustion occurs at a steady rate, the heat generated causes expansion of the flowing gases and since the chambers are open at their rearward ends the constant pressure cycle produces a forward thrust on the aircraft. When air from the compressor 16 is allowed to flow freely through the chambers 24 and 25 without any combustion of fuel and with the gates 30 and 31 in the forward position there is also a propulsive thrust exerted comparable to that which might be exerted by a tractor propeller on the aircraft. This condition of operation is termed a "ducted fan," since the air compressed in the forward compressor 16 is merely channeled through the chambers 24 and 25 and exhausted to the atmosphere. During this ducted fan operation the outlet or exhaust nozzles 24' and 25' should have a minimum area. When there is combustion occurring in the chambers 24 and 25, particularly with the gates 30 and 31 in forward position and the compressor 16 in operation, the area of discharge at the exhaust nozzles 24' and 25' must be increased on account of the large increase in the volume of flowing gases due to combustion. Even with the increase in nozzle area the jet velocity will increase and a greater thrust will be produced. Thus it is seen that when there is a maximum heating effect in the coburning chambers 24 and 25, there will be a maximum amount of gaseous expansion accompanied by an increased discharge velocity at the exhaust nozzles 24' and 25'.

The hinged flaps for use in determining the cross sectional area of exhaust nozzles 24' and 25' are provided with suitable positioning or position adjusting means. For example Fig. 3 illustrates one possible arrangement of servomechanism for the flap 25''. A reversible electric motor 60 includes a worm gear drive shaft 61 and the worm gear thereon meshes with a worm wheel 62 rigidly mounted on the shaft 63 which forms the axis of rotation of flap 25''. Thus operation of the electric motor 60 in the proper direction will cause movement of the flap 25'' to a desired setting with respect to the walls of the exhaust nozzle 25'. A similar hinged flap and servomechanism may be used with the exhaust nozzle 24'.

The turbojet engine enclosed in the central nacelle 8 is supplied with ram air by way of the air bypass 18. The engine itself includes an air compressor 46 having a rotor element 47 rigidly connected by a tubular shaft to a turbine rotor 48. Rearwardly of the rotor 48 is a second rotor 49 rigid with the drive shaft 20 and counter-rotating with respect to the first rotor 48. The rearward end of the central shaft 20 is journaled in a bearing assembly 51 mounted centrally of the engine housing by means of arms 52. Between the compressor 46 and the gas turbine is an annular combustion space 53 having perforated flame holders 54 therein. Fuel lines 55 carry liquid fuel under pressure into the flame holders where it is atomized by fuel nozzles to provide steady combustion of liquid fuel in the combustion space. The heated air and products of combustion which result, flow rearwardly to drive the two counter-rotating turbine wheels 48 and 49 and the gases are guided into driving relation with respect to the turbine blades by means of the fixed guide vanes 56.

The present dual cycle or dual jet aircraft power plant has operating advantages which are unique and noteworthy. By proper selection of fuel flow to the combustion chambers a wide range of thrusts is provided and the coburning chambers 24 and 25 are an added safety feature, since they may operate as ramjets in an emergency to propel the aircraft to a suitable landing field after failure of the turbojet section centrally of the aircraft. In this emergency situation the air control gates 30 and 31 would be set in the rearward position to allow flow of ram air by way of inlet passages 28 and 29 into chambers 24 and 25. Some additional ram air might come in through the compressor 16 but it will be understood that the emergency situation arose because of some failure in the rotating assemblies including compressors 16 and 46 or failure of the combustion system of the turbojet engine. The principal operating combinations which are possible in the power plant as herein disclosed are as follows:

(1) Turbojet operating with forward compressor acting as ducted fan and no combustion in the side chambers 24 and 25.
(2) Turbojet operating with flow spoiler down and reverse flow of air from forward compressor by way of passages 28 and 29.
(3) Turbojet operating and coburning chambers operating on compressed air with steady combustion therein.
(4) Coburning chambers operating alone on ram air as twin ramjets.

The emergency condition as stressed above is covered in part (4) and in this condition the forward compressor 16 will be inactive and the gates 30 and 31 will be in the rearward position. In condition (1) above the gates will be in the forward position, in condition (2) the gates will be in the intermediate position (solid lines) and in condition (3) the gates will be in the forward position.

The aircraft power plant or propulsion system as described will provide a maximum degree of flexibility and so will find its greatest utility on military aircraft of the fighter or interceptor type. The power plant may eventually have a greater weight per pound of thrust at cruising conditions than a conventional turbojet engine but the fuel consumption will be lower resulting in better range performance. For maximum thrust conditions it will have lower weight per pound of thrust than a conventional turbojet engine with an afterburner. Therefore it will have a wider speed range between cruising speed and maximum speed. The airplane braking action is quite marked, because of the possibility of simultaneous use of the flow spoiler 10 and the reverse flow of compressor air from the passages 28 and 29. The operating conditions enumerated above result in varying amounts of thrust but the condition (1) represents normal cruising power, (2) represents negative thrust or decelerating condition, (3) represents full power, and (4) represents emergency power. In all these conditions variation in the fuel flow rate as determined by the fuel injection pressure will make possible considerable variation in the total thrust on the aircraft.

The embodiments of the invention herein shown and described are to be regarded as illustrative only and it is to be understood that the invention is susceptible of variations, modifications and changes within the scope of the appended claims.

I claim:

1. An airplane power plant comprising, a first air compressor including a central drive shaft extending in a fore-and-aft direction with respect to the airplane, means providing an air inlet communicating with the inlet side of said first air compressor to supply ram air thereto, a first combustion chamber extending fore-and-aft of the airplane connected at its forward end to the outlet side of said first air compressor and open to the atmosphere at its rearward end to provide free flow of the products of combustion into the atmosphere, a first fuel injection nozzle in said first combustion chamber, means supplying liquid fuel to said first fuel injection nozzle, a second air compressor coaxial with respect to said first air compressor and rearwardly thereof, conduit means bypassing said first air compressor for supplying ram air from said air inlet to the inlet side of second air compressor, a second combustion chamber rearwardly of said second air compressor and connected to the outlet side of said second air compressor, a second fuel injection nozzle in said second combustion chamber, means supplying liquid fuel to said second fuel injection nozzle, a gas turbine including two coaxial and independent rotor elements driven by the combustion products of said second combustion chamber, an exhaust nozzle for conducting the gases passing through said gas turbine into the free atmosphere rearwardly of the aircraft, and coaxial shaft elements connecting said two rotor elements to said first and second air compressors respectively.

2. An airplane power plant comprising, an air compressor including a central drive shaft extending in a fore-and-aft direction with respect to the airplane, means providing a first air inlet opening forwardly of the airplane and communicating with the inlet side of said air compressor to supply ram air thereto, a combustion chamber extending fore-and-aft of the airplane connected at its forward end to the outlet side of said air compressor and open to the atmosphere at its rearward end, means providing a second air inlet opening forwardly of the airplane and communicating with the forward end of said combustion chamber, gate means at the forward end of said combustion chamber and positionable in a first position to allow free flow of air thereinto from said second air inlet as well as from said air compressor, in a second position to stop all air flow into said combustion chamber and in a third position to stop the flow of ram air from said second air inlet into said combustion chamber but allow free flow of compressed air from said air compressor into said combustion chamber, said gate means in said second position directing the flow of compressed air from said air compressor in a reverse direction out of said second air inlet to provide a negative thrust on said airplane, a fuel injection nozzle in said combustion chamber, means supplying liquid fuel to said fuel injection nozzle, and means coaxial with respect to said air compressor and connected to the drive shaft thereof for applying steady rotative power thereto.

3. An airplane power plant comprising, a first air compressor including a central drive shaft extending in a fore-and-aft direction with respect to the airplane, means providing a first air inlet communicating with the inlet side of said first air compressor to supply ram air thereto, a first combustion chamber extending fore-and-aft of the airplane connected at its forward end to the outlet side of said first air compressor and open to the atmosphere at its rearward end, means providing a second air inlet opening forwardly of the airplane and communicating with the forward end of said first combustion chamber, gate means at the forward end of said first combustion chamber and positionable in a first position to allow free flow of air thereinto from said second air inlet as well as from said first air compressor, in a second position to stop all air flow into said first combustion chamber and in a third position to stop the flow of ram air from said second air inlet into said first combustion chamber but allow free flow of compressed air from said first air compressor into said first combustion chamber, said gate means in said second position directing the flow of compressed air from said first air compressor in a reverse direction out of said second air inlet to provide a negative thrust on said airplane, a first fuel injection nozzle in said first combustion chamber, means supplying liquid fuel to said first fuel injection nozzle, a second air compressor coaxial with respect to said first air compressor and rearwardly thereof, conduit means bypassing said first air compressor for supplying ram air from said first air inlet to the inlet side of said second air compressor, a second combustion chamber rearwardly of said second air compressor and connected to the outlet side of said second air compressor, a second fuel injection nozzle in said second combustion chamber, means supplying liquid fuel to said second fuel injection nozzle, a gas turbine including two coaxial and independent rotor elements driven by the combustion products of said second combustion chamber, an exhaust nozzle for conducting the gases passing through said gas turbine into the free atmosphere rearwardly of the aircraft, and coaxial shaft elements connecting said two rotor elements to said first and second air compressors respectively.

References Cited in the file of this patent

UNITED STATES PATENTS

| Number | Name | Date |
|---|---|---|
| 2,280,835 | Lysholm | Apr. 28, 1942 |
| 2,503,006 | Stalker | Apr. 4, 1950 |
| 2,527,732 | Imbert | Oct. 31, 1950 |

FOREIGN PATENTS

| Number | Country | Date |
|---|---|---|
| 9,435 | Great Britain | May 1, 1908 |
| 585,557 | Great Britain | Feb. 11, 1947 |
| 600,075 | Great Britain | Mar. 31, 1948 |